May 6, 1947.  L. FOOTE  2,420,072
DIFFERENTIAL HOIST
Filed Sept. 2, 1944  3 Sheets-Sheet 1

INVENTOR
LEONARD FOOTE.
BY
Chas. E. Townsend.
ATTORNEY.

May 6, 1947.　　　　　L. FOOTE　　　　　2,420,072
DIFFERENTIAL HOIST
Filed Sept. 2, 1944　　　　3 Sheets-Sheet 2
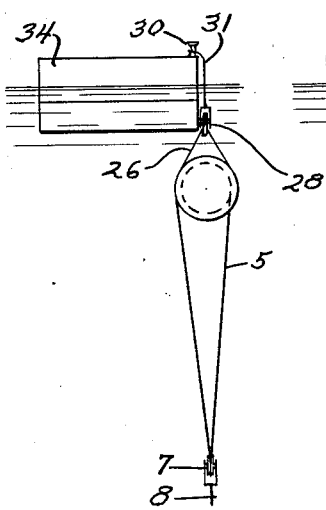
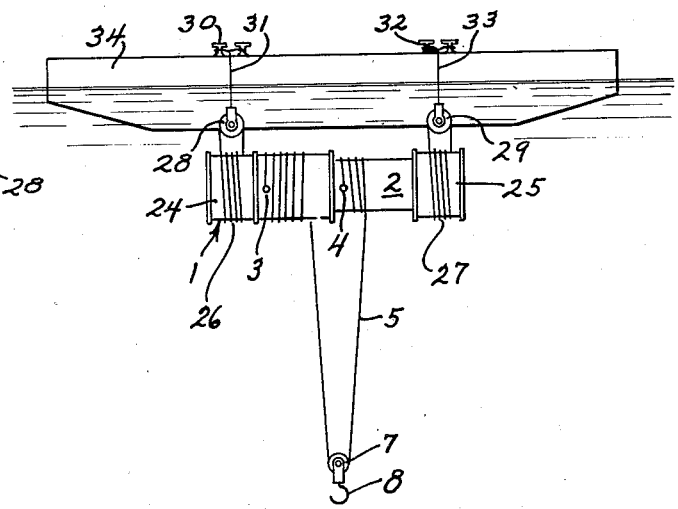
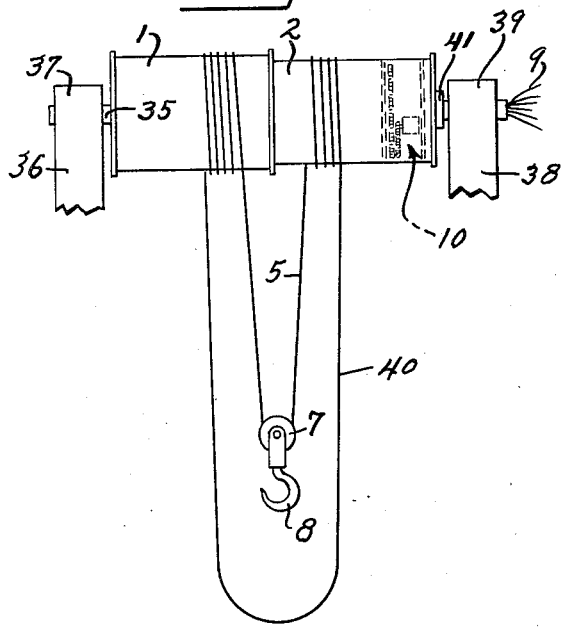
INVENTOR,
LEONARD FOOTE.
BY
Chas. E. Townsend.
ATTORNEY.

May 6, 1947. L. FOOTE 2,420,072
DIFFERENTIAL HOIST
Filed Sept. 2, 1944 3 Sheets-Sheet 3
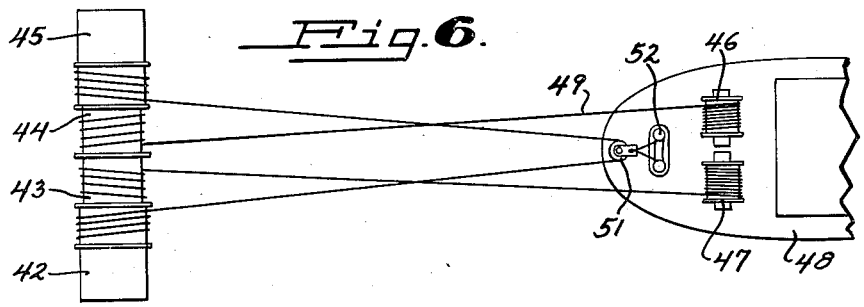
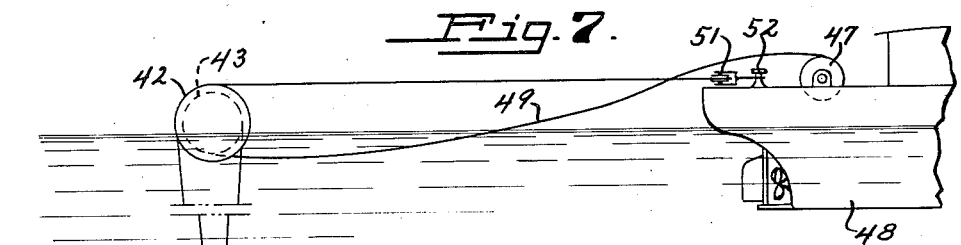
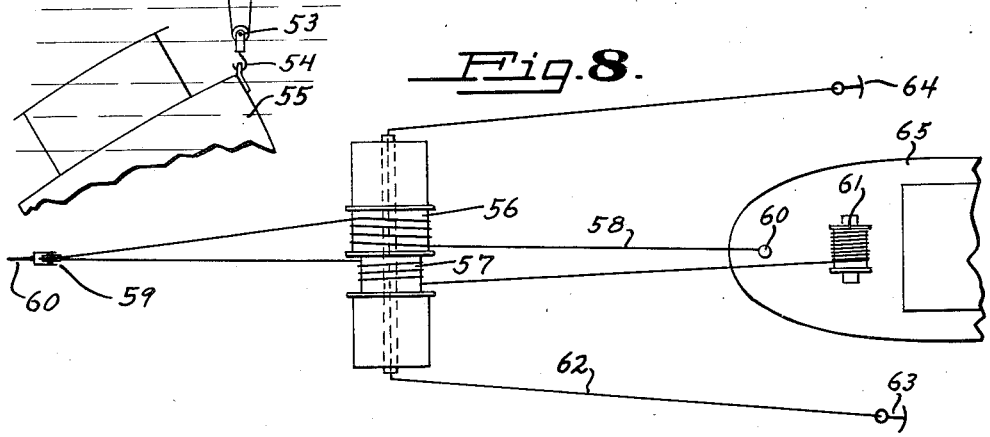
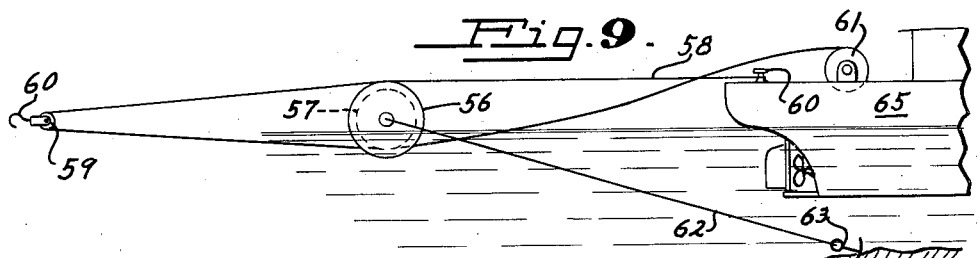
INVENTOR,
LEONARD FOOTE.
BY
Chas. E. Townsend
ATTORNEY.

Patented May 6, 1947

2,420,072

UNITED STATES PATENT OFFICE 2,420,072

DIFFERENTIAL HOIST

Leonard Foote, Palo Alto, Calif.

Application September 2, 1944, Serial No. 552,482

4 Claims. (Cl. 114—51)

The present invention relates to improvements in differential hoist systems and more particularly to novel differential hoist systems suitable for use in marine salvage and analogous operations.

The conventional differential hoist, which is also commonly known as the Weston differential pulley block, has certain inherent disadvantages which render it unsuitable for many types of lifting and other operations. One of the primary drawbacks is the fact that the Weston differential pulley block, in conventional design, cannot be practicably made and utilized in the large sizes necessary for marine salvage and analogous operations.

It is an object of the present invention to provide an improved differential hoist arrangement which may be practicably constructed in any desired size and in which the mechanical energy losses in the form of friction are greatly reduced. A further object is to provide an improved drive system for differential hoists. Another and primary object is to provide a differential hoist particularly adapted for use in submarine hoisting. A still further object is to provide a combined differential hoist and buoyancy tank. In a preferred embodiment of the invention, it is an object to provide a combined differential hoist and buoyancy tank together with an internal drive mechanism for the differential hoist disposed within the buoyancy tank. Other objects, together with some of the advantages to be derived in utilizing the present invention, will become apparent from the following detailed description thereof, taken together with the accompanying drawings forming a part of the specification, and wherein:

Figure 3 is a schematic side view of a modified form of the invention employing auxiliary buoyancy means for the differential hoist.

Figure 4 is an end view of the arrangement shown in Figure 3.

Figure 5 is a side elevation of a modification of the arrangement shown in Figure 1.

Figure 6 is a schematic plan view of another modification of the invention employing external drive means for the differential hoist when utilized for submarine hoisting.

Figure 7 is a side elevation of the schematic view shown in Figure 6.

Figure 8 is a schematic plan view of a fourth modification of the invention illustrating the utilization of a combined buoyancy tank and differential hoist for other than submarine hoisting purposes.

Figure 9 is a side elevation of the schematic view shown in Figure 8.

Figure 1:
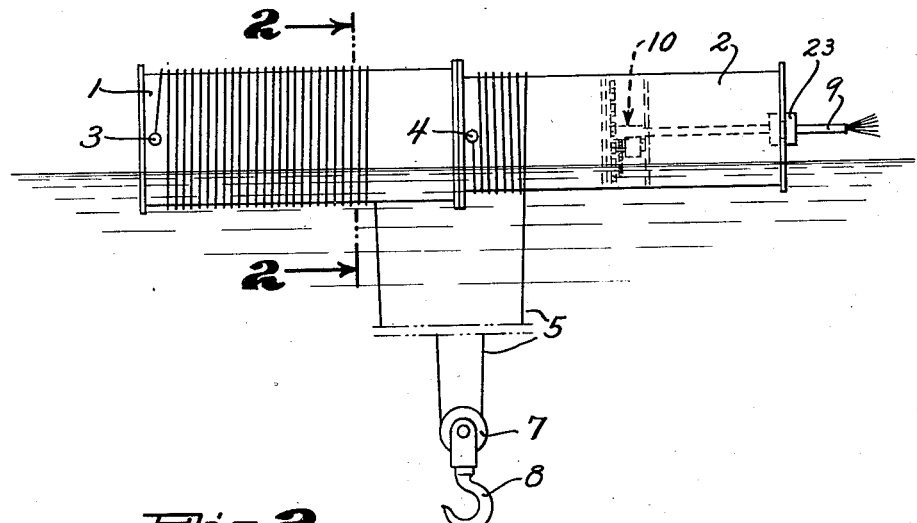
Figure 1 is a side elevation of a combined differential hoist and buoyancy tank with internal drive for the hoist.
Figure 2:
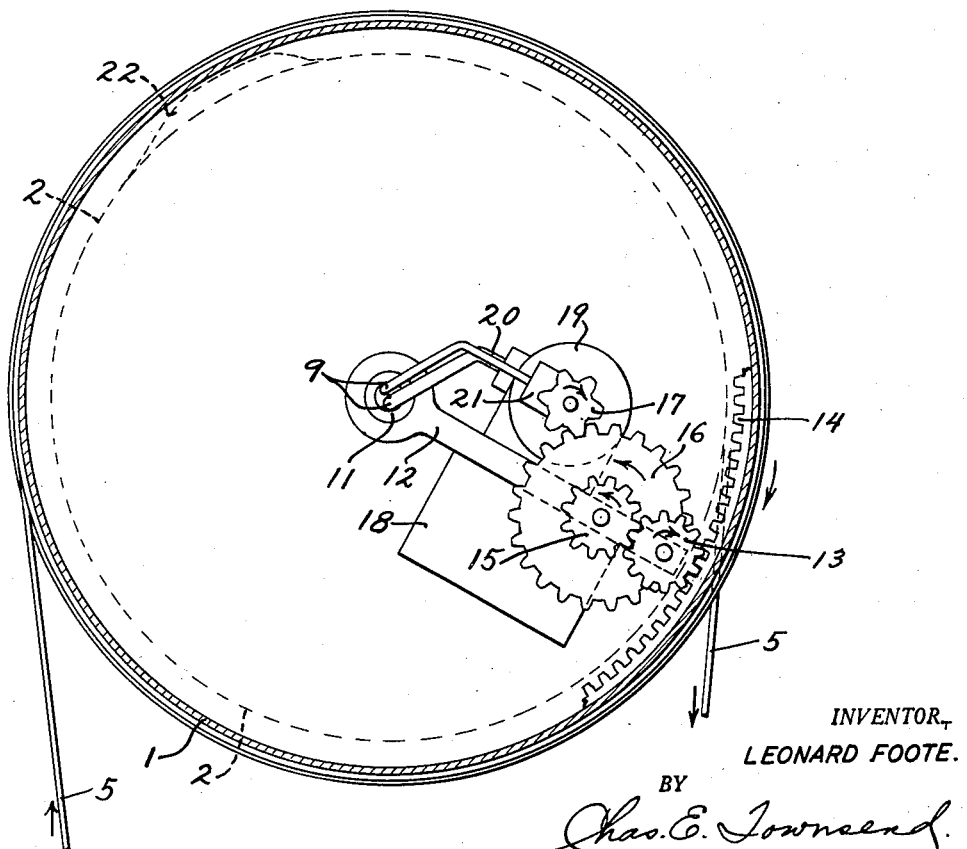
Figure 2 is an enlarged end elevation, partly in section, through 2—2 of Figure 1.

Referring particularly to Figures 1 and 2, the differential hoisting arrangement comprises a floating buoyancy tank formed of two rigidly connected tubular sections 1 and 2, section 2 being smaller in diameter than section 1 in a ratio preferably falling within the range commonly employed in conventional differential hoists, i. e., the ratio of the diameter (D) of the larger section 1 to the diameter (d) of the smaller section 2 is within the approximate range of 11:10 to 25:24. Cable means 5 in the form of rope, chain, steel wire or the like is attached at one end at 3 to section 1 of the buoyancy tank and part of the length thereof is spooled on section 1 of the buoyancy tank. The cable passes from section 1 through a single sheave pulley block 7, which supports a load hook, 8, and is spooled on section 2 of the buoyancy tank, being rigidly attached thereto at 4. The buoyancy tank is rotated by means of an internal drive mechanism generally indicated at 10 and described in detail hereinafter. Power conduit means 9 enters the buoyancy tank through a conventional water tight rotatable bushing at 23.

An annular gear track 14 is provided in the interior of the buoyancy tank. Pivot arm 12 is pivotably mounted on axial shaft 11 which is mounted within the buoyancy tank. Gear 13 is rotatably mounted on the end of pivot arm 12 and engages annular gear track 14. Gear 15 is also rotatably mounted on pivot arm 12 and engages gear 13. Gear 16 is driven by gear 17 which is mounted on the drive shaft of motor 19 which is rigidly mounted on pivot arm 12. Gear 16 is rigidly attached to gear 15 and turns therewith. Counterweight 18 is mounted on and supported by pivot arm 12. A conventional solenoid brake 21 is provided on motor 19 which is supplied current through electrical conduit means at 20, connected to electrical conduit means 9, through bushing 23.

The operation of the differential hoist mechanism is as follows:

With the buoyancy tank floating in water, the load hook 8 is attached to the underwater load which it is desired to raise. Current is then supplied to motor 19, pivot arm 12 being raised as gear 13 is rotated by means of the gear train and travels along annular gear track 14. Counterweight 18 is, of course, also raised by pivot arm 12 and causes rotation of the buoyancy tank when raised to an intermediate position (depending upon the load) sufficient to counterbalance the load through the differential hoist system. When the counter-balance point has been reached, continued operation of motor 19 results in continued rotation of the buoyancy tank, pivot arm 12 and counterweight 18 remaining stationary. Solenoid brake 21 is utilized to prevent overhauling of the differential hoist when it is desired to hold the load at the desired raised or any intermediate level. Other suitable means may be employed for braking purposes, if desired, as for example a non-overhauling worm gear may be included in the gear train or a protuberance extending to the diameter of section 1 of the buoyancy tank may be provided on the smaller section 2 of the buoyancy tank, as shown in dotted line at 22 of Figure 2. If the rotation of the buoyancy tank is stopped in a position whereat the cable leaving section 2 of the buoyancy tank is adjacent protuberance 22, both sections of the buoyancy tank have the same effective diameters and the differential hoist will not overhaul itself.

For purposes of illustration, a suitable differential hoist such as shown in Figures 1 and 2 capable of lifting approximately 800 tons under its own buoyancy, is formed as a buoyancy tank 100 feet long with larger section 1 thereof 20 feet in diameter and smaller section 2 thereof 19 feet in diameter. Counterweight 18 is positioned on pivot arm 12 a distance of 5 feet from the pivoted end thereof and weighs 40 tons. Each rotation of the buoyancy tank, which serves also as the pulley drum, raises sheave 7 a distance equal to $\pi/2$ feet, since the general equation for differential hoists provides that the lower sheave is raised a distance of $\pi(D-d)/2$ with each revolution of the pulley drum and in the example described above $D-d$ is equal to 1. It will be appreciated, of course, that the arrangement shown in Figures 1 and 2 may be of any desired size best suited for the particular application for which it is to be employed, small hand operated units being suitable for raising and lowering underwater cables, pipelines and the like and larger units being employed for ship or other heavy salvage work. Furthermore, a plurality of units of any desired size may be employed for heavy salvage operations and the like.

In Figures 3 and 4 an arrangement is shown for increasing the load carrying capacity of differential hoist units of the general type shown in Figures 1 and 2. In this embodiment of the invention the buoyancy tank comprising sections 1 and 2 is in Figure 1 is further provided with extensions 24 and 25 at opposite ends thereof. Continuous cables as at 26 and 27 pass around extensions 24 and 25 respectively and through sheaves 28 and 29 respectively. Support elements as at 31 and 33 are attached to bitts 30 and 32 respectively which are mounted on a barge 34 and support sheaves 28 and 29 respectively. In this manner the load carried by the hoist arrangement may be greater than that which could normally be supported by the buoyancy tank, since the additional buoyancy of the barge is effectively employed. In the arrangement shown, the buoyancy tank is free to rotate by means of the continuous cable supports passing through sheaves 28 and 29 which are supported by the barge. An internal drive mechanism such as shown in Figure 2 may be employed to rotate the buoyancy tank.

In Figure 5, the differential hoist is shown mounted on bearings 37 and 39 by means of shaft 35, supports 36 and 38 being provided for bearings 37 and 39 respectively. In this embodiment of the invention, which is suitable for general use in other than marine applications, cable 5 passes around sections 1 and 2 of the pulley drum a sufficient number of turns to insure frictional grip thereof and the extra cable depends in a hanging loop 40, thus forming a continuous cable. The internal drive mechanism of Figure 2 is employed at 10. This arrangement is suitable for either hand operation by means of hanging loop 40 when handling light loads or alternatively may be driven by the internal mechanism at 10.

In Figures 6 and 7 the motive power for operating the differential hoist according to the present invention is provided by a tug boat 48. The differential hoist comprises a double unit consisting of two smaller sections at 43 and 44 and two larger sections 42 and 45, the four sections being formed as a rigid buoyant unit. The cable 49 is attached at one end to storage drum 47, passes around pulley drum section 43 with sufficient turns to insure frictional grip, thence through a 2-sheave block 53 and around pulley drum section 42 with sufficient turns to insure frictional grip. From pulley drum section 42 the cable passes through an equalizing sheave 51 which is secured to bitt 52 on tug boat 48, around pulley drum section 45 with sufficient turns to insure frictional grip, through 2-sheave block 53, around pulley drum section 44 with sufficient turns to insure frictional grip and terminates on storage drum 46. The cables leading from the storage drums 46 and 47 to pulley drum sections 43 and 44 are normally maintained in a slack condition. Load hook 54 is carried by 2-sheave block 53 and is attached to a hulk 55 or other load which it is desired to lift. As tug boat 48 moves away from the differential hoist under its own power, the load exerted on the cable leading from equalizing sheave 51 to pulley drum sections 42 and 45 causes the pulley drum unit to rotate and thus raise the load, while at the same time cable is continuously fed to pulley drum sections 43 and 44 from storage drums 46 and 47. The double differential hoist unit in combination with the equalizing sheave mounted on the tug boat prevents twisting of the hoist unit as the load is placed on the driving cables.

Figures 8 and 9 illustrate the utilization of the present differential hoist unit for refloating beached vessels and analogous operations. The buoyancy tank 56 is provided with a section of reduced diameter at 57. Cable 58 is secured to a bitt 60 on a towing vessel 65, passes around the buoyancy tank 56 with sufficient turns to insure frictional grip, through a sheave 59, around section 57 of buoyancy tank 56 with sufficient turns to insure frictional grip and terminates on storage drum 61 mounted on towing vessel 65. A pair of anchors 64, 63 are disposed seawardly from buoyancy tank 56 and secure buoyancy tank 56 against shoreward movement by means of cable 62 which leads from anchor 63 through buoyancy tank 56 to anchor 64. Alternatively, separate cables may be employed to each anchor with swivel attachments to buoyancy tank 56, the essential requirement being that the buoyancy tank is free to rotate with respect to the anchor cables. Load hook 60 is attached to the beached vessel and the hoist operated by towing vessel 65 which, in moving seawardly, applies a load to the cable leading from bitt 60 to buoyancy tank 56 which brings about the rotation of the buoyancy tank and consequently exerts a pulling force on sheave 59 and load hook 60. Cable is continuously supplied to section 57 of buoyancy tank 56 from storage drum 60, the line from the storage drum normally being maintained slack. Anchors 64 and 63 prevent both the tendency of the buoyancy tank to twist and to move shoreward as the load is exerted by towing vessel 65.

Various advantages have been demonstrated to accrue in the utilization of the present invention, as for example the combination differential hoist and buoyancy tank detailed above is virtually frictionless, excepting of course the friction in the lower load carrying sheave and the bending of the cable. This is attributed to the fact that the water is the bearing surface for the differential pulley drum. It has been demonstrated in practice that with an arrangement similar to that illustrated in Figures 1 and 2, the hoist will overhaul itself with a very light load on the load hook. Further, when utilized in submarine salvage operations, the present arrangements provide convenient means for storing the great lengths of cable necessary and at the same time greatly facilitate the actual hoisting operations since it is not necessary to sink a number of buoyancy tanks alongside the sunken vessel, secure them to the vessel (a dangerous and time consuming operation) and then displace the water in the tanks with air, which necessitates large compressor capacity and numerous air lines to the submerged tanks. To the contrary, employing the differential hoist of the instant invention, it is only necessary to secure the load carrying cables to the vessel and then operate the hoist. A further advantage lies in the constant control which is easily maintained over the hoisting operation, the load being raised as slowly or rapidly as desired and the hoisting operation being stopped and started as convenience dictates, as opposed to the use of submerged buoyancy tanks which tend to bob rapidly to the surface with the load as soon as a positive buoyancy is attained by displacement of the water and which often results in serious and often irreparable damage.

The internal drive mechanism provides a convenient, efficient and easily controlled means for operating the differential hoist whether employed in combination with a buoyancy tank or mounted on bearings as shown in Figure 5.

I claim:

1. In a differential hoist, the combination comprising a rotatably mounted differential pulley drum, including sections of larger and smaller diameters, cable means leading from said differential pulley drum to and supporting load carrying means to form a differential hoist, driving means arranged and adapted to rotate said differential pulley drum internally mounted within said differential pulley drum and braking means for said differential hoist comprising a protuberance on said smaller diameter section of said pulley drum extending to the diameter of said larger diameter section of said pulley drum.

2. In a differential hoist the combination comprising a differential pulley drum including sections of larger and smaller diameters and formed as a buoyancy tank, cable means leading from said differential pulley drum to load carrying means to form a differential hoist, an internally mounted annular gear track disposed within said differential pulley drum in a plane other than parallel to the longitudinal axis of said differential pulley drum, a pivot arm pivotally mounted within said differential pulley drum, a gear rotatably mounted on said pivot arm and engaging said gear track, a counterweight supported by said pivot arm, power means mounted on said pivot arm and driving said gear mounted on said pivot arm through a gear train and braking means for said differential hoist comprising a protuberance on said smaller diameter section of said pulley drum extending to the diameter of said larger diameter section of said pulley drum.

3. In a differential hoist system the combination comprising a double differential pulley drum including sections of larger diameter separated by adjacent sections of smaller diameter, said pulley drum being formed as a buoyancy tank, cable means leading from a tension equalizing element and around said larger diameter pulley drum sections in frictional engagement therewith, said cable means thence leading through a two-sheave depending load carrying element, thence around said smaller diameter sections of said pulley drum and terminating on cable storage elements, thereby forming a double differential hoist and means for exerting a load on said tension equalizing element in a direction away from said pulley drum sufficient to rotate said pulley drum.

4. In a differential hoist system, the combination comprising a differential pulley drum including sections of larger and smaller diameter and formed as a buoyancy tank, cable means leading from a tensioning element around said larger diameter section of said pulley drum in frictional engagement therewith, thence through load carrying sheave means, thence around said smaller diameter section of said pulley drum in frictional engagement therewith and terminating on cable storage means, thereby forming a differential hoist, anchor means securing said differential pulley drum against change in alignment along the longitudinal axis thereof under load conditions and means for exerting sufficient tension load on said tensioning element to rotate said pulley drum.

LEONARD FOOTE.

REFERENCES CITED

The following references are of record in the file of this patent:

UNITED STATES PATENTS

| Number | Name | Date |
| --- | --- | --- |
| 1,201,337 | O'Neal | Oct. 17, 1916 |
| 2,039,870 | Adams | May 5, 1936 |
| 1,104,964 | Cobb | July 28, 1914 |
| 475,172 | Airey et al. | May 17, 1892 |
| 853,238 | Groash | May 14, 1907 |
| 1,288,108 | Messer | Dec. 17, 1918 |
| 1,264,257 | Beckwith | Apr. 30, 1918 |
| 1,268,082 | Beckwith | June 4, 1918 |

FOREIGN PATENTS

| Number | Country | Date |
| --- | --- | --- |
| 13,249 | Great Britain | 1913 |